United States Patent Office 3,390,857
Patented July 2, 1968

3,390,857
RESILIENT CAR-SEAT CARRIAGE
Karl Gösta Nyström, Umea, Sweden, assignor to AB Nordpatent, Umea, Sweden, a limited company of Sweden
Filed June 6, 1966, Ser. No. 555,315
Claims priority, application Sweden, June 9, 1965, 7,576/65; May 13, 1966, 6,632/66
8 Claims. (Cl. 248—399)

ABSTRACT OF THE DISCLOSURE

The present invention relates to a resilient car-seat carriage of the kind comprising a plurality of carrier arms or levers pivotally mounted in the carriage frame, said arms carrying the seat and being mechanically interconnected in such a way that, as the seat is subjected to load, they are positively moved angularly in unison, so that the seat will always move in parallel relation to itself, said arms being acted on by one or more carrier springs urging the seat towards a top-limit position.

Objects and introduction

The invention has for its principal object to provide improved resilient means enabling convenient control of the resilient force acting on the seat.

With this object in view there is provided, according to the invention, a resilient car-seat carriage which is mainly characterized in that the spring mounting connected with the frame is manually adjustable relative to said frame and is acted on by a plurality of compensating springs acting in opposition to the carrier springs to reduce the effort required to adjust the said spring mounting.

The invention is applicable with particular advantage to a specific type of resilient carriage of the kind referred to in the opening paragraph in which, in order to minimize the overall height of the structure, the carrier springs are disposed horizontally connected to dependent levers extending transversely relative to the carrier arms and rigidly connected to the pivot shafts of the latter. Where, as usually desirable, the carrier arms are made substantially longer than the maximum vertical throw of the seat, and the depending arms coupled with the carrier springs are made substantially shorter to reduce overall height, then the tension of the carrier springs will be very high and essentially higher than the loading of the seat, which makes an adjustment of the spring tension more difficult. However, owing to the presence of the compensating springs, the resulting force acting on the adjustable spring mounting will be sufficiently low to enable the mounting to be adjusted rapidly and conveniently by the occupant of he seat.

Another object of the invention resides in the provision of improved means for adjusting the top-limit position of the seat, and for cushioning vertical seat movements when travelling over rough ground.

The invention will now be described more in detail in conjunction with the accompanying drawings illustrating a preferred embodiment thereof, and in which.

Figure 1:
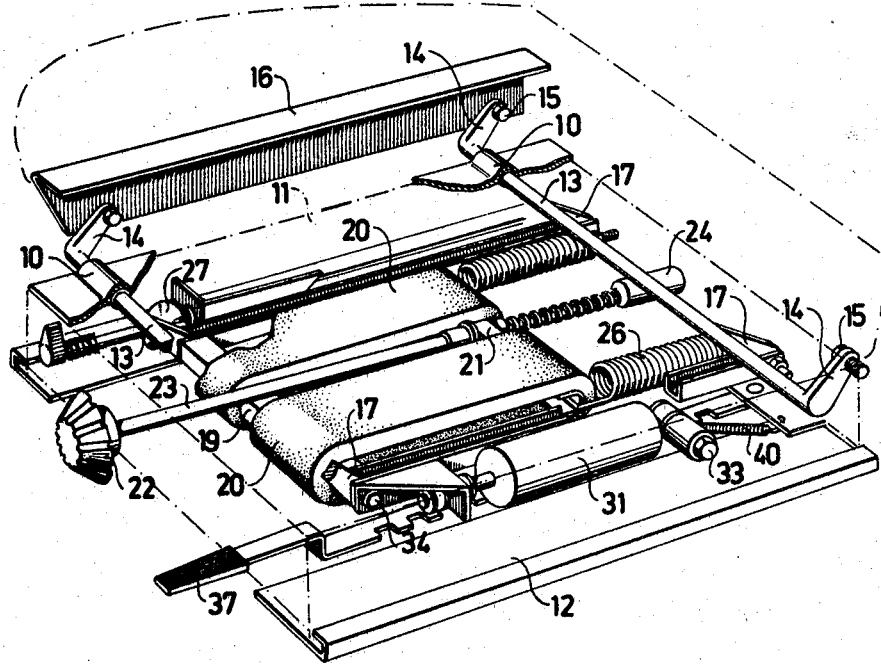
FIGURE 1 is a perspective view of the resilient carriage as seen from above.
Figure 2:
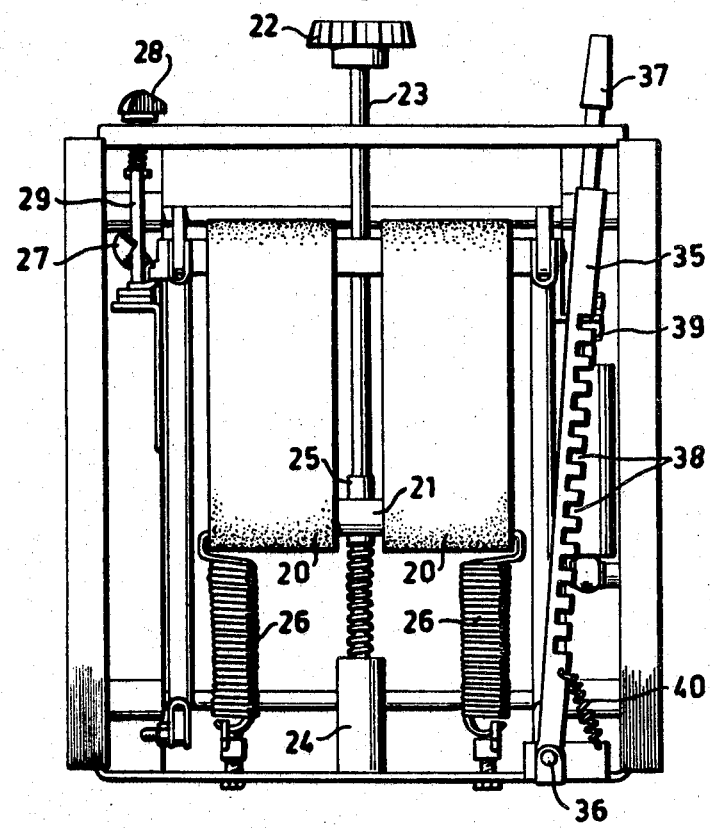
FIGURE 2 is a plan view of the same seen from below.

Referring now to the drawing, four bearings 10 mounted in a frame 11, which is adjustable longitudinally of the vehicle floor along two stationary rails 12, have journalled therein two shafts 13. Each shaft at each end thereof carries a carrier arm or lever 14 extending upward in a rearwardly inclined direction, each arm being connected to the seat frame 16 by a pivot pin 15. Slightly spaced inwardly from each bearing 10 a lever 17, preferably shorter than levers 14, is rigidly mounted on each shaft so as to extend downward approximately at right angles to the carrier arm or lever 14. Levers 17 are interconnected in pairs by rods 18 of a length equal to the spacing of the shafts, said rods forming together with levers 17 a parallelogram linkage which, in association with shafts 13, will ensure that all the levers 14 will move in unison, thereby causing the seat frame always to move in parallel relation to itself without subjecting the pivotal connections 15 between the seat frame and carrier levers to breaking stresses.

The pivotal connections for the two frontmost levers 17 are constituted by the ends of a transverse shaft or rod 19 extending therebetween. Mounted round the latter are two tension springs in the form of endless belts 20 made of rubber or any other suitable resilient material. The opposite spring mounting, which is adjustable, is formed by a transversely extending channel member 21 which is connected to the frame 11 through an adjustment mechanism. The latter comprises a spindle 23 passed through a bore formed in channel 21 and provided with a screw-thread at its rear end and with a knob 22 at its front end, its screw-threaded end engaging a nut 24 rigidly attached to the frame, the spindle 23 being formed intermediate its ends with a collar 25 abutting the channel. When turning spindle 23 clockwise it is moved further into the nut and carries with it the channel or spring mounting 21, thereby further tensioning rubber belts 20. Counter-clockwise rotation of the spindle will reduce the belt tension. The screw preferably has a large-pitch screwthread to thereby enable a slight rotation of the spindle to cause a substantial change in spring bias. For compensating or balancing out a portion of the force exerted on the spring mounting 21 by the tensioned rubber belts, two tensioned metallic coil springs 26 are mounted between the spring mounting and frame. By suitably selecting the bias of the compensating springs 26, it is possible to reduce to a maximum the effort required to turn control spindle 23 to increase the spring load opposing the downward movement of the seat.

Figure 3:
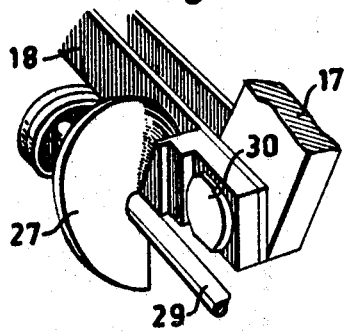
FIGURE 3 illustrates on a larger scale and adjustable limit stop forming part of the carriage.
Figure 4:
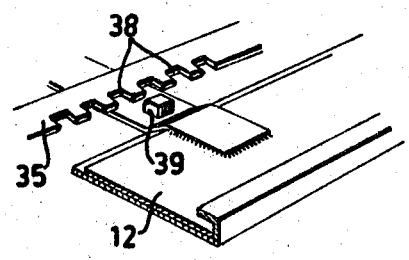
FIGURE 4 illustrates, also on a larger scale, a fractional portion of a device incorporated in the carriage for locking the carriage frame in different positions of forward displacement relative to the vehicle.

In order to enable the desired bias of springs 20 to be maintained in the non-loaded condition of the seat, the carriage must be provided with stops adapted to prevent the seat from moving upward beyond a predetermined top-limit position. Such stops may be realized in numerous different ways. In the embodiment shown, the stop is constituted by a helical surface 27 carried by a spindle 29 which is rotatably but nondisplaceably mounted on the frame and provided with a knob 28. Co-operating with helix 27 is a shoulder rigidly connected to the pivot pin 30 interconnecting one of the rods 18 forming part of the parallelogram linkage with one of the depending levers 17; see especially FIGURE 3. When turning spindle 29 clockwise as seen in FIGURES 1 and 3, the top-limit position of the carrier levers 14 and thus of the seat carried thereby will become lowered, while, upon rotation of the spindle in the opposite sense, said top-limit position will be displaced upward. Such top-limit adjustment may be made with great ease even with the seat in its loaded condition thanks to the provision of the compensating springs.

The carriage illustrated in the drawing further incorporates a shock absorber 31 which is so arranged and designed as to set up a substantially higher resistance to forces tending to move the seat upward and away from the carriage frame, than to forces acting on the seat in the opposite direction. Thus, the shock absorber, primarily, serves to prevent any rapid seat movements in the upward direction, whereas it opposes rapid downward movements to a reduced extent only. The designing and arranging of the shock absorber in this way will involve the favourable result that a person occuping the seat will experience the shocks to which the vehicle is subjected in moving on a rough road considerably more gently than would be the case where the shock absorber opposed a resistance of equal magnitude to downward movements as to upward movements of the seat.

In the embodiment illustrated in the drawing, shock absorber 31 is connected between a pivot pin 33 mounted on the rear portion of the frame and a pivot pin 34 secured to the front end of one connecting rod 18. In this case the shock absorber, in order to operate in the manner described, must be so devised as to oppose a compression of the same considerably more forcefully than an extension of the same. However, it is understood that the mounting of the shock absorber as well as its design can be varied in several different ways.

To lock the carriage frame in any desired position along the stationary rails 12, a control rod 35 is provided which is pivoted at its rear end on a vertical pivot pin 36 fixed in the vehicle floor and has handle 37 at its front end. The control rod is formed along one lateral edge with a plurality of locking notches 38 adapted selectively to co-operate with a locking lug 39. A spring 40 tends to keep the control rod in engagement with the locking lug.

I claim:
1. A resilent seat carriage comprising in combination:
   (a) a seat carriage frame,
   (b) a separate main frame,
   (c) a plurality of pivotally mounted carrier arms extending between said seat carriage frame and said main frame,
   (d) a mechanical linkage arrangement interconnecting said carrier arms so as to cause them to move angularly in unison,
   (e) a first mounting member that is associated with the mechanical linkage arrangement and which moves when said carrier arms move,
   (f) a second mounting member that is associated with said main frame,
   (g) a first resilient tensioning means tensioned between said first mounting member and said second mounting member so as to urge said carrier arms in an upward direction, and to also urge said first and second mounting members toward each other,
   (h) adjustment means for manually adjusting the position of said mounting member relative to said main frame so as to adjust the bias of the resilient tensioning means, and
   (i) a second resilient tensioning means tensioned between said second mounting member and said main frame.

2. A resilient seat carriage according to claim 1 which additionally includes a stop means for limiting the upward movement of the seat carriage.

3. A resilient seat carriage according to claim 2 wherein said stop means comprises a helical surface associated with a spindle rotatably but axially non-displaceably mounted on the main frame and provided with a knob.

4. A resilient seat carriage according to claim 3 wherein said helical surface cooperates with a shoulder attached to said mechanical linkage arrangement.

5. A resilient seat carriage according to claim 4 wherein said adjustment means comprises a screw extending in substantially parallel relation to the first and second tensioning means and which interconnects said second mounting member with said main frame.

6. A resilient seat carriage according to claim 4 wherein said first resilient tensioning means comprises at least one resilient belt.

7. A resilient seat carriage according to claim 6 wherein said second resilient tensioning means comprises at least one metallic coil spring.

8. A resilient seat carriage according to claim 4 which includes a shock absorber that is so designed as to set up a substantially greater resistance to upwardly directed movements of the carrier arms than to downward movements of the carrier arms and which interconnects the main frame and said mechanical linkage.

References Cited

UNITED STATES PATENTS

| | | | |
|---|---|---|---|
| 2,318,583 | 5/1943 | Bernstein | 267—89 |
| 2,630,854 | 3/1953 | Neher | 248—399 |
| 2,986,199 | 5/1961 | Ferreira et al. | 248—399 |
| 3,076,628 | 2/1963 | Smith et al. | 248—399 |
| 3,183,854 | 5/1965 | Candlin et al. | |

FOREIGN PATENTS

| | | |
|---|---|---|
| 805,601 | 5/1951 | Germany. |
| 930,903 | 7/1963 | Great Britain. |

ROY D. FRAZIER, *Primary Examiner.*

ROBERT P. SEITTER, *Assistant Examiner.*